United States Patent [19]

Allaeys

[11] Patent Number: 4,728,038

[45] Date of Patent: Mar. 1, 1988

[54] SUSPENSION OF A DISTRIBUTING DEVICE ON AN AGRICULTURAL VEHICLE

[75] Inventor: Pierre C. C. Allaeys, Poperinge, Belgium

[73] Assignee: Multinorm B. V., Nieuw Vennep, Netherlands

[21] Appl. No.: 869,446

[22] PCT Filed: Jan. 28, 1983

[86] PCT No.: PCT/EP83/00045

§ 371 Date: Sep. 6, 1983

§ 102(e) Date: Sep. 6, 1983

[87] PCT Pub. No.: WO83/02544

PCT Pub. Date: Aug. 4, 1983

Related U.S. Application Data

[63] Continuation-in-part of Ser. No. 541,340, Sep. 6, 1983, abandoned.

[30] Foreign Application Priority Data

Feb. 1, 1982 [DE] Fed. Rep. of Germany ....... 3203210
Jul. 8, 1982 [DE] Fed. Rep. of Germany ....... 3225601

[51] Int. Cl.[4] .............................................. A01M 7/00
[52] U.S. Cl. .................................................... 239/164
[58] Field of Search ............... 239/159, 164, 172, 160, 239/165, 166–169, 176; 180/41; 280/6 R

[56] References Cited

U.S. PATENT DOCUMENTS

| | | | |
|---|---|---|---|
| 919,966 | 2/1909 | Lamiell et al. | 239/167 |
| 2,940,532 | 6/1960 | Lear et al. | 180/41 X |
| 3,117,647 | 1/1964 | Polko | 180/41 X |
| 3,809,316 | 5/1974 | Dreyer | 239/167 |

FOREIGN PATENT DOCUMENTS

| | | | |
|---|---|---|---|
| 1607387 | 10/1969 | Fed. Rep. of Germany . | |
| 2256714 | 8/1975 | France | 239/168 |
| 2289116 | 5/1976 | France . | |
| 2342016 | 9/1977 | France | 239/167 |
| 1425162 | 2/1976 | United Kingdom | 239/167 |

*Primary Examiner*—Andres Kashnikow
*Attorney, Agent, or Firm*—Balogh, Osann, Kramer, Dvorak, Genova & Traub

[57] ABSTRACT

A cross-member is fitted with roller-tracks extending obliquely outwardly or inwardly in a downward direction, a distributing appliance being mounted upon the roller-tracks, either directly by way of rollers or indirectly by way of an intermediate beam having at its ends, roller-tracks extending obliquely outwardly or inwardly in a downward direction, having additional rollers. Rollers may be mounted, instead of upon the distributing appliance, upon the cross-member or, if necessary, upon the intermediate beam, the roller-tracks being arranged accordingly upon the top of the distributing appliance. Furthermore, sliding ways and sliding shoes may be provided instead of the roller-tracks and rollers.

16 Claims, 14 Drawing Figures

1
2
3
4
5
6
6'
7
8
9
10
S
α

SUSPENSION OF A DISTRIBUTING DEVICE ON AN AGRICULTURAL VEHICLE

This application is a continuation-in-part of application Ser. No. 541,340, filed Sept. 6, 1983, now abandoned.

BACKGROUND OF THE INVENTION

1. Field of the Invention

The invention relates to the suspension of a distributing appliance, having an elongated spray-pipe, from the chassis of an agricultural vehicle, of the type set forth in claim 1.

2. Description of the Prior Art

In the spraying of liquid or solid substances over the ground, e.g. for fertilizing, the greater the length of the spray-pipe projecting from both sides of the agricultural vehicle, at right angles to the direction of travel and close to the ground, the more rapid the spraying operation. There is, however, a limit to the length of such spray-pipes in that, in order to ensure uniform distribution of the substances sprayed, the entire length of the pipe must pass over the ground at a distance as uniform as possible therefrom. Since no completely flat track is available to a vehicle operating in a field, it is impossible to prevent the said vehicle from tilting at right angles to its direction of travel, and if the spray-pipe is secured rigidly to the vehicle, at a low height above the ground, the outer ends thereof are likely to strike the ground, even at small angles of tilt.

For this reason, swinging suspensions for distributing appliances have been known for some considerable time (e.g. German Pat. No. 1 181 485). Although these may be used in the case of continuous ruts on one side of the vehicle with otherwise horizontal ground, unevenly undulating ground, causing alternate lateral tilting of the vehicle, results in dangerous swinging of the distributing appliance in its vertical longitudinal plane. Although such distributing appliances can be improved quite easily by means which displace their centres of gravity laterally (German Pat. No. 20 33 773), making it possible to use them on a vehicle travelling along a slope, here again there is a tendency for the pipe to swing, and this swinging is damped only inadequately by resilient damping means (DD Pat. No. 91 743 and German AS No. 26 56 279) because of the restoring forces which counteract the required deflections.

In order to avoid said aforementioned swinging motions of the distributing appliance when travelling along a slope of a hill, it is known by the German AS No. 1 607 387 (Maass) to turn the distributing appliance, itself suspended like a pendulum at an upper longitudinal axis of the agricultural vehicle, around its suspension axis and to fix it relative to the vehicle at the actual angle of the slope, so as to obtain a uniform distance between the distributing appliance and the ground. However, this proposal was never prosecuted, as it is troublesome and practically impossible to compensate in time the inevitable permanent alterations of the angle of the slope of a hill and the uneveness of the track while operating on said slope.

By the FR - A - 2,289,116 (Demaret) are known suspensions of a distributing appliance according to the preamble of claim 1 by means of two cables, articulated rods, or the like tension elements of equal length extending obliquely downward in a bifilar manner from the two ends of a cross beam or the like vehicle chassis, thus providing for a non-circular moving and swinging path of the distributing appliance relative to the travelling agriculture vehicle and therewith providing for a better damping effect than is possible with circular oscillations. Thus suspended, the distributing appliance with a vehicle travelling along a slope, can also be better guided parallel with the ground. However, the disadvantage still remains that, when the vehicle tilts, righting moments are applied to the distributing appliance as a result of gravity and the inertia of the tension elements which, in their turn, tend furtheron to oscillations like a pendulum, and this again leads to undesirable swinging of the said distributing appliance from its horizontal attitude. Furthermore, this swinging suspension of the distributing appliance by tension elements also fails to prevent the said appliance, in the event of a permanent tilt of the chassis, from being deflected, as the tilt increases, through an increasing angle, with the result that the material is again not sprayed sufficiently uniformly.

SUMMARY OF THE INVENTION

It is the purpose of the invention, to improve the suspension of the distributing appliance according to the last-mentioned known art in a manner that lateral tilting of the vehicle carrying the distributing appliance remains, as far as possible, without detrimental reactions upon the said distributing appliance correctly aligned parallel with the surface of the ground.

Based upon the device stipulated as already known in the preamble to the main claim, this purpose is achieved, according to the invention, by the teaching set forth in the characterizing portion of the said claim.

Such a suspension of the distributing appliance dispenses not only with any circular moving path of the suspended distributing appliance, but also with any deflecting cables, articulated rods, or the like oscillating tension elements. Therefore, the mass inertia of the distributing appliance can act, when the vehicle tilts laterally, in relation to the distributing appliance, unaffected by any reaction forces such as those which are unavoidable in the case of articulated rods adapted to pivot about a suspension point and themselves possessing mass inertia. The result of this is that, with the proposed suspension, the desired initial position of the distributing appliance, namely, at a distance as uniform as possible above the horizontal, or more or less sloping, surface of the ground, is affected by lateral tilting of the travelling agricultural vehicle substantially less than with all hitherto-known suspensions. The proposed rollers or sliding shoes, with their tracks, have furthermore the advantage that each track or sliding way need not necessarily be in the form of an arc, as the case may be with the under end of an articulated rod or the like. Instead, it may be curved at will in accordance with the results of practical tests and may also be run in an accurate straight line, while in every case, both tracks or sliding ways forming a non-circular moving path of the distributing appliance.

Also, the suspension of a distributing appliance according to the DE-OS No. 16 07 387 is provided with two guide rollers pivoted a mutual distance at a frame of an agricultural vehicle, without mentioning that this suspension is not freely movable, but only positively actuated in its position of angle. Also, in this appliance, any free mobility would result in pendulum-like swinging motions of the distributing appliance around its upper pivot, when it is moved over an uneven surface of the ground. Therefore, this known suspension with guide rollers could give no suggestion for finding a non-circular suspension of a distributing appliance with the path means according to the present invention.

In one form of the invention, the mounting of the uppermost roller- or sliding-shoe directly upon the cross-beam since, in this case, for a given structiral height of the said cross-beam on the chasis, a particularly large vertical distance is obtained between the centre of gravity of the distributing appliance and the (uppermost) roller- or sliding-shoe mounting located on the said cross-beam, and thus a correspondly greater pendulum-moment compensating for lateral tilt of the vehicle.

Whereas suspending the distributing appliance by means of rollers or sliding shoes and simple roller-tracks and sliding ways may be an advantage in that the said unit can, if necessary, be rapidly removed from the cassis of the agricultural vehicle, it may be worthwhile to provide an as far as possible permanent connection between the distributing appliance and the intermediate beam or beams, or between the said distributing appliance and the chassis of the agricultural vehicle.

Other advantageous configurations of the invention are indicated in other sub-claims.

BRIEF DESCRIPTION OF THE DRAWINGS

The invention is explained hereinafter in greater detail in conjunction with the examples of embodiment illustrated diagrammatically in the drawing attached hereto, wherein.

DESCRIPTION OF THE PREFERRED EMBODIMENTS

Figures 1, 1B:
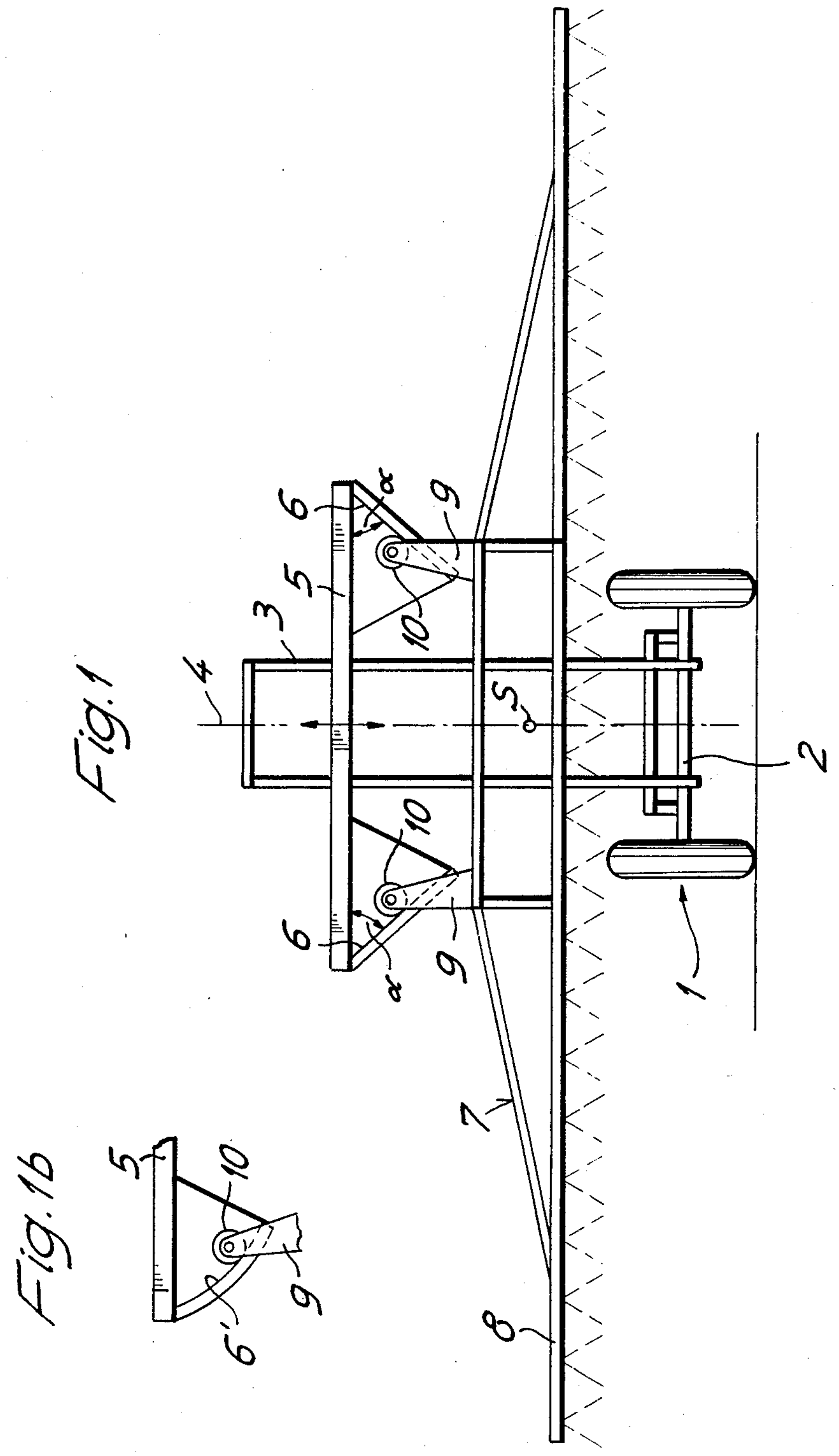
FIG.1 illustrates a first example of a suspension for a distributing appliance from the chassis of an agricultural vehicle, as used over horizontal ground and as seen from the rear (with the said vehicle in a horizontal attitude)
FIG. 1*b* is a rear view, as in FIG. 1, of a roller-track and roller which are modified as compared with FIG. 1.

Agricultural vehicle 1, illustrated in FIG. 1, comprises, at the rear of its chassis 2, a column 3 rigidly secured thereto, the upper rear area of which carries a suspension means such as a cross-beam 5 also running at right angles to longitudinal central plane 4 of the said vehicle. Cross-beam 5 is arranged on column 3 to be adjustable in height in a conventional manner, not shown.

The said cross-beam, which projects on both sides from column 3, comprises at both ends path means such as roller-tracks 6 extending linearly, obliquely inwardly, in mirror image, in a downward direction, the said roller-tracks sloping at an angle $\alpha$ of about 60° in relation to the said cross-beam.

Suspended from cross-beam 5 by roller-tracks 6 is a distributing appliance 7, the underside of which comprises an elongated spray-pipe 8 projecting on both sides from vehicle 1, at right angles to the longitudinal direction thereof and arranged at a uniform distance above the surface of the ground, for the purpose of spraying, and distributing uniformly, liquid or solid substances, over the surface of the ground or over vegetation growing thereon. Distributed uniformly over the length of the said spray-pipe are nozzles through which the substance, for example a fertilizer, may be sprayed in each case in the form of a cone. The manner in which the substance to be sprayed is stored and fed to spray-pipe 8, and also the design of the aforesaid nozzles, may be according to any known design and is not an object of the present invention, wherefore these features are not described hereinafter in greater detail and are also not shown in the drawing attached hereto.

As may furthermore be gathered from FIG. 1, distributing appliance 7 comprises, in mirror-image in relation to its transverse central plane and centrally of the two roller-tracks 6, two upwardly projecting support-arms 9 at the free end of each of which a path means traversing member such as a roller 10 or other member movable along the roller-track 6, resting upon the relevant roller track, is mounted. Under the action of an appropriate force, distributing appliance 7 can execute, in its vertical longitudinal central plane, and within a small range, pivoting motions in relation to cross-beam 5, during which rollers 10 carry out corresponding rolling movements upon roller-tracks 6. However, the said suspension is not actually used to tilt the said distributing appliance in relation to the surface of the ground, but to maintain its predetermined initial position, in a manner described hereinafter in greater detail, even when vehicle 1 tilts laterally.

Figure 1A:
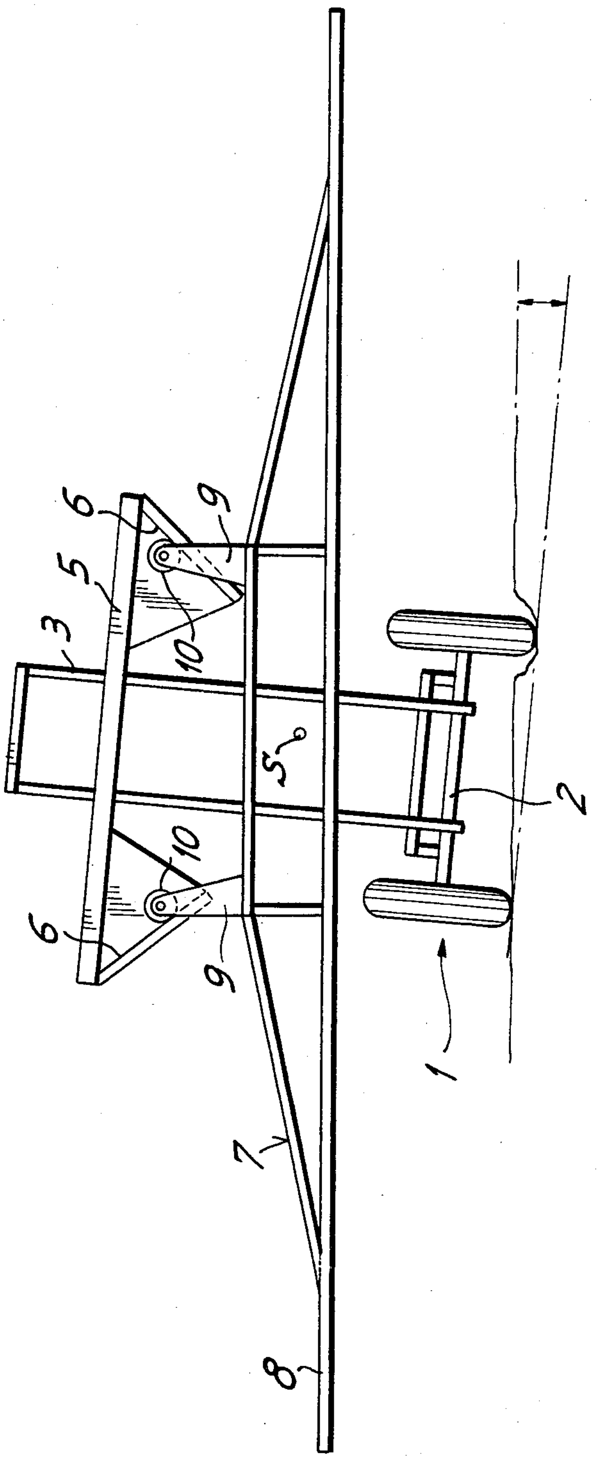
FIG.1a is a representation corresponding to that in FIG. 1 with the vehicle tilted laterally by a rut on one side.

If, while it is travellng, the agricultural vehicle passes from an exactly horizontal track (cf. FIG. 1) to one in which it right-hand wheels, for example, are running in a rut, and is thereby caused to tilt in the manner shown in FIG. 1*a*, then the described suspension, because of its substantially lower centre of gravity S in relation to rollers 10, and its greater mass-inertia, retains its previous exactly horizontal attitude almost unchanged. As a result of this, there is also no change in the distribution of the sprayed material while the said distributing appliance is in use. It is therefore possible to rely upon highly uniform distribution of the sprayed material over a field with or without vegetation, even when the agricultural vehicle is travelling over uneven ground and tilts accordingly.

Whereas roller-tracks 6 according to FIG. 1 run linearly, it may be an advantage, depending upon the size of the distributing appliance, for example, to use roller-tracks 6' having a slight concave curvature, as shown in FIG. 1*b*.

Figures 2, 2B:
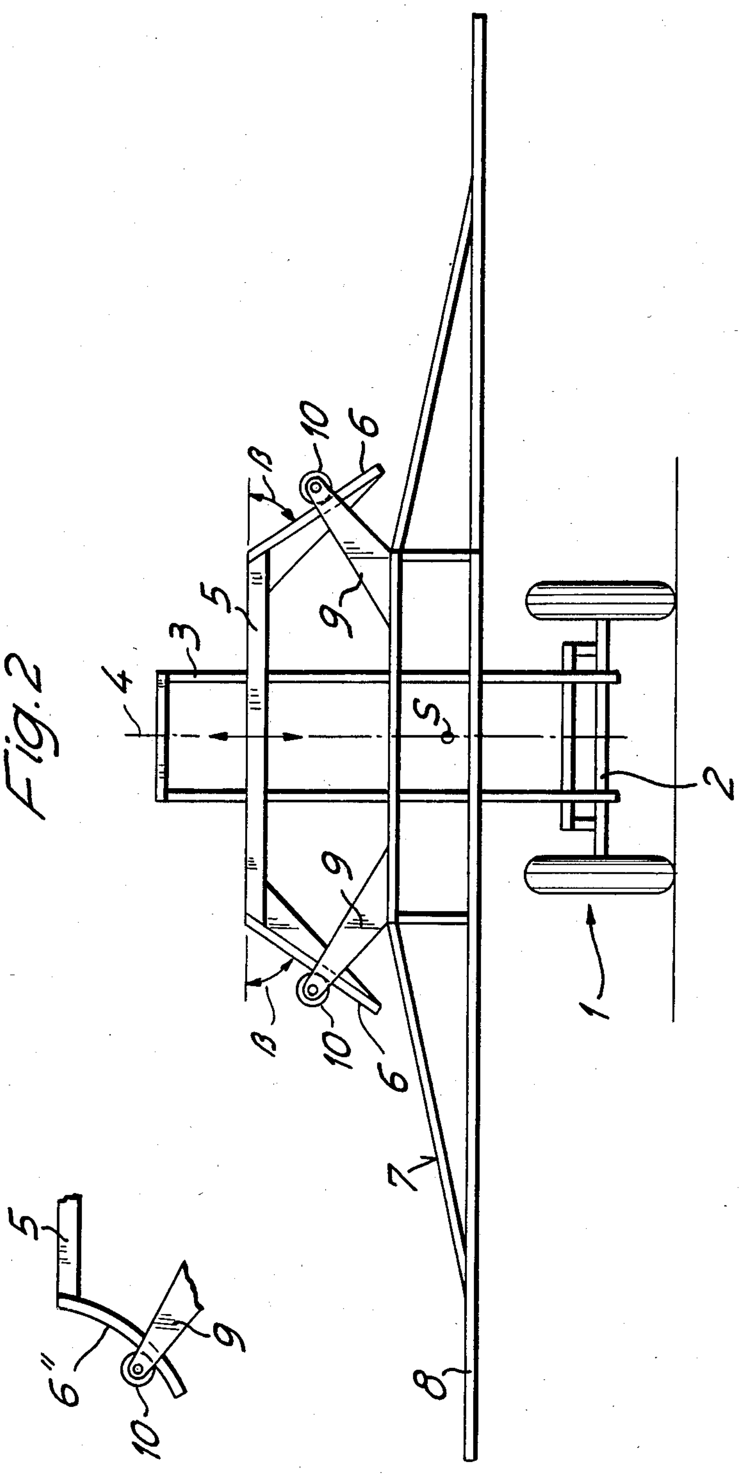
FIG. 2 is a rear view, as in FIG. 1, of a second example of a suspension for a distributing appliance, for use when the agricultural vehicle is travelling along a slope.
FIG. 2*b* is a view, as in FIG. 2, of a roller-track and roller which are modified as compared with FIG. 2.
Figure 2A:
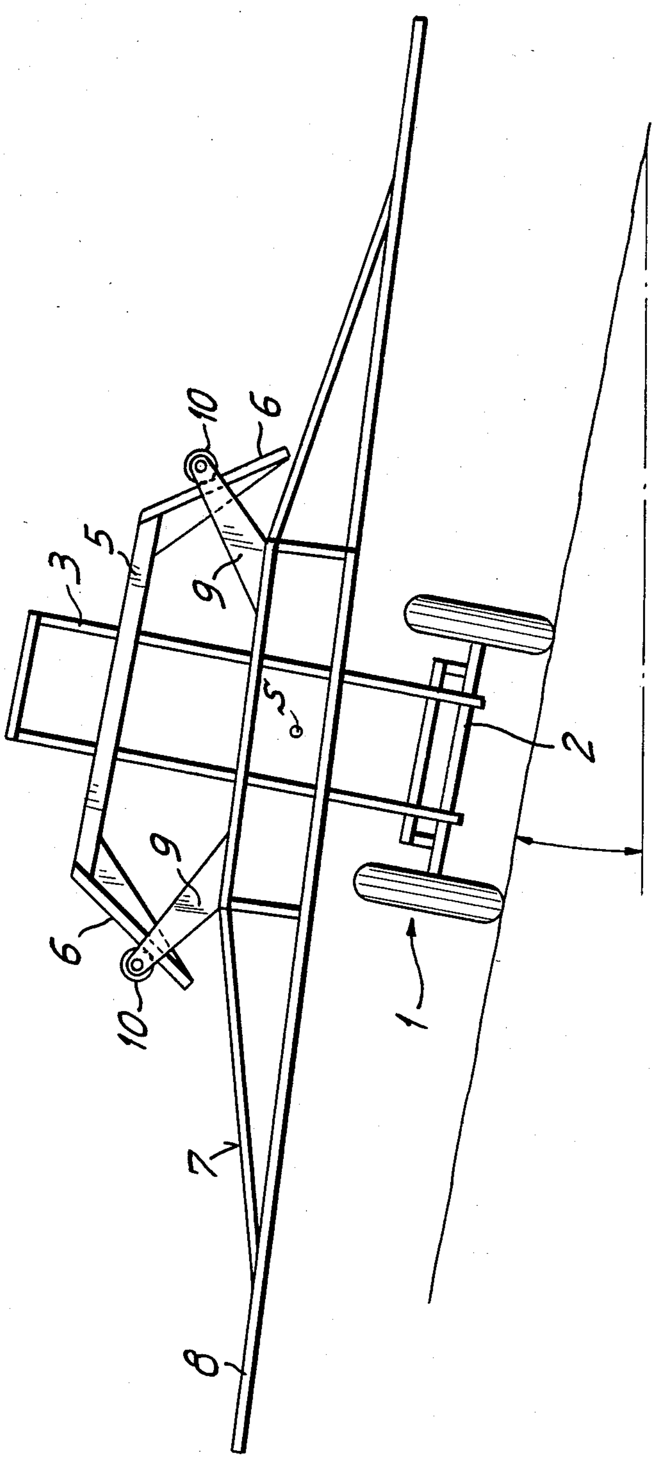
FIG. 2*a* is a rear view, as in FIG. 2, of the vehicle travelling along a slope.

The second example of embodiment, illustrated in FIG. 2, differs from the first in that the roller tracks located at each end of the cross-beam run linearly outwardly, in mirror-aimage, in a downward direction, at an angle $\beta$ of about 60°. If the vehicle is standing, or travelling, with this suspension upon a horizontal track, spray-pipe 8 remains in a horizontal plane above the said track. If, however, the vehicle is travelling along a slope, in the manner shown in FIG. 2*a*, the modified suspension causes distributing appliance 7 to tilt from its horizontal attitude through approximately the same angle as the said vehicle. Thereafter, in the event of any unevenness along the track, here again the lower centre of gravity S of the said appliance in relation to rollers 10, and its mass-inertia, cause the appliance to retain its original attitude, so that the whole length of the spray-pipe remains at an approximately constant distance from the surface of the slope.

Again, in the case of this second example of embodiment, it may be an advantage to use roller-tracks 6'' having a slightly concave slope as shown in FIG. 2*b*.

Figure 3:
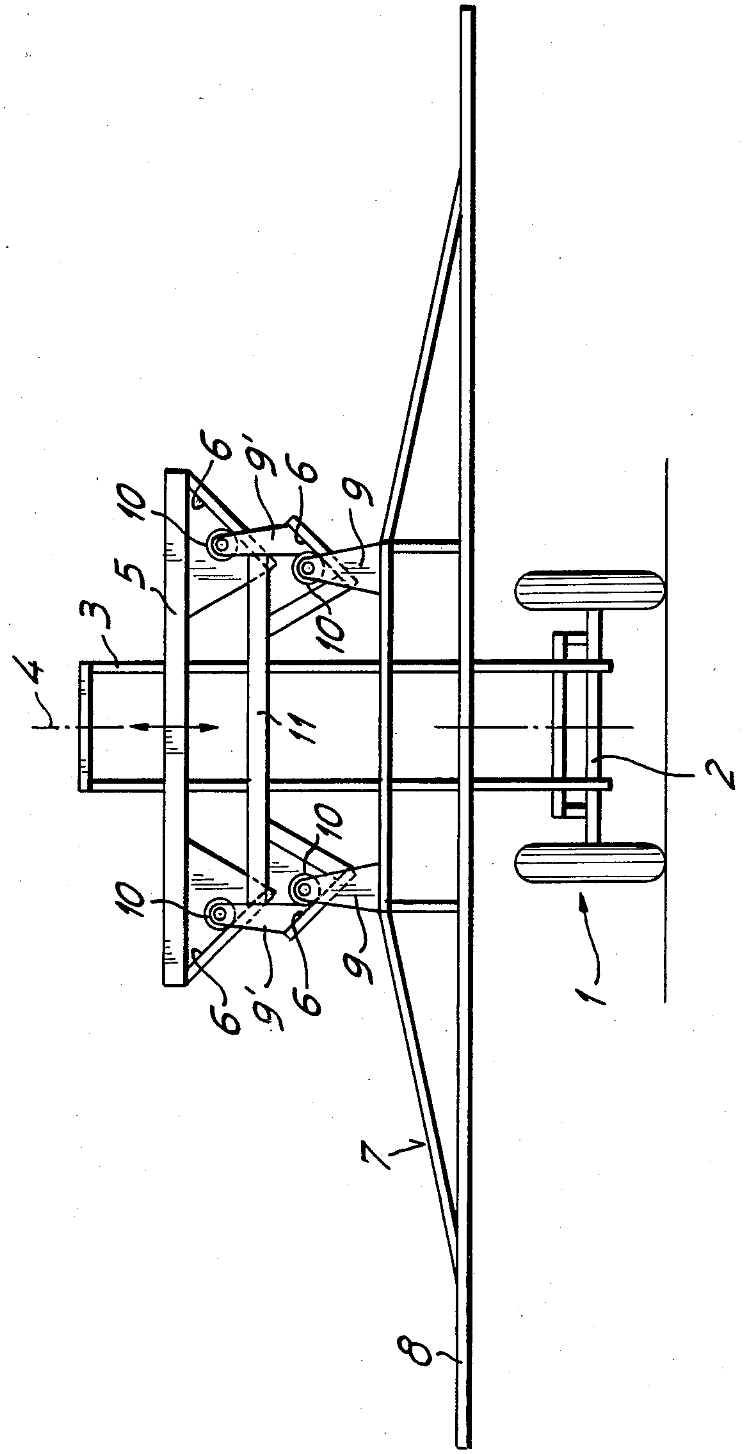
FIG. 3 illustrates a third example of a suspension for a distributing appliance, from a cross-beam on the chassis, by means of an intermediate beam (seen from the rear as in FIG. 1), this example otherwise corresponding to that in FIG. 1.
Figure 3A:
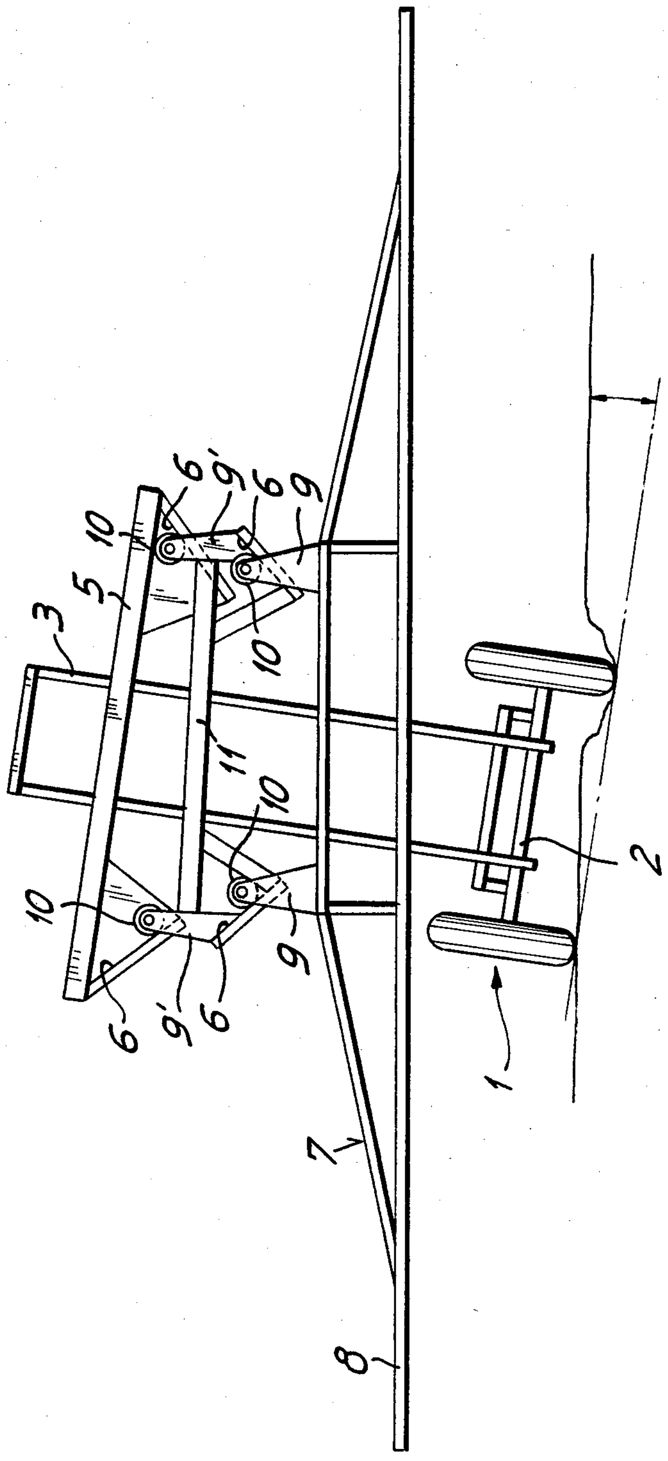
FIG. 3*a* is a rear view, corresponding to that in FIG. 1*a*, of the suspension according to FIG. 3, with the vehicle tilted laterally by a rut on one side.

The third example of embodiment, illustrated in FIG. 3, differs from the first in that distributing appliance 7 is suspended from cross-beam 5 by an intermediate beam 11 while retaining the suspension-principle of the said first example. The said intermediate beam, mounted in the same manner as the distributing appliance in the first example of embodiment, namely by means of rollers running on path means such as tracks 6 in cross-beam 5, also carries path means such as roller-tracks 6 upon its two downwardly extending support-arms 9' which, like the roller-tracks in cross-beam 5, run inwardly, in mirror-image, towards each other, in a downward direction. The distributing appliance is in turn mounted, with its rollers 10, upon two lower roller-tracks 6. As may be gathered from FIG. 3*a*, suspending the distributing appliance from cross-beam 5, by means of a separate intermediate beam 11, allows for still greater tilting of the vehicle while the said appliance retains its horizontal attitude.

Figure 4:
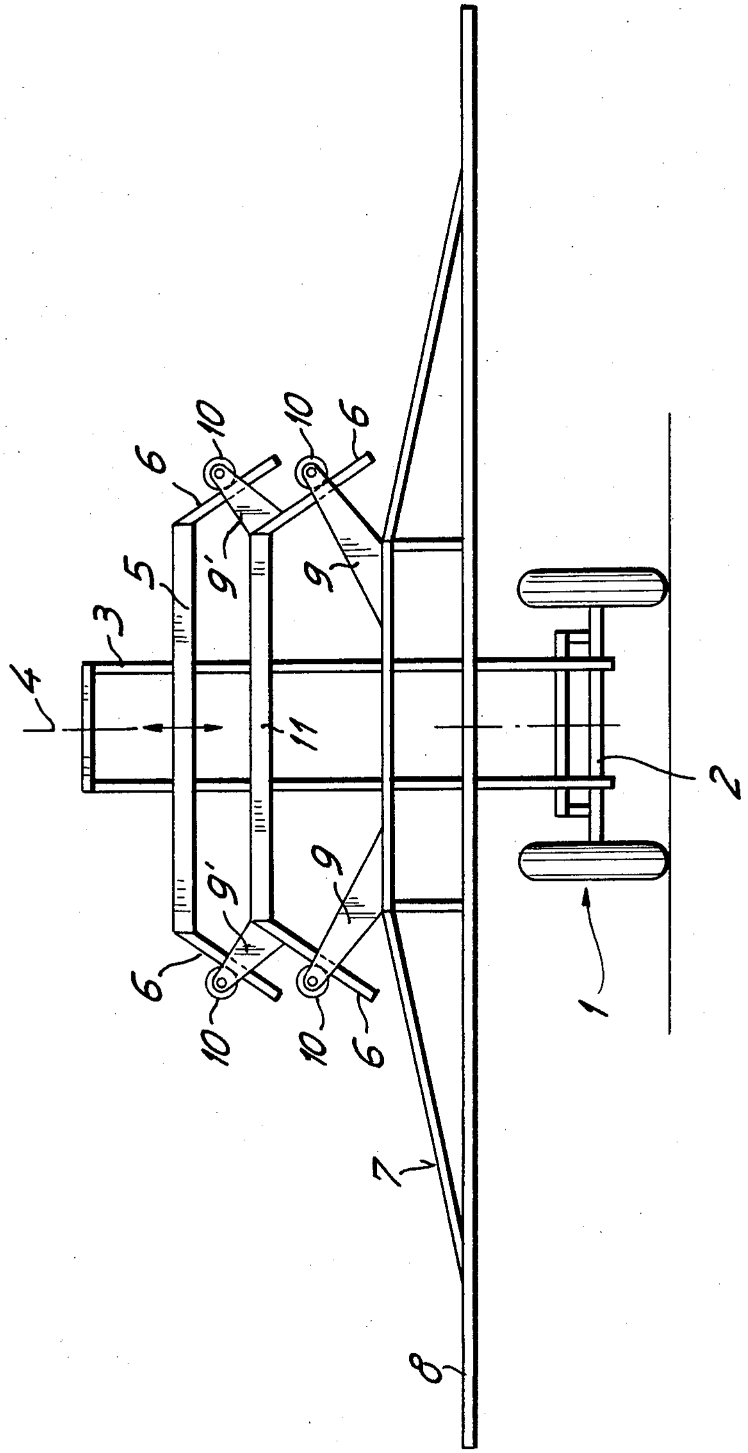
FIG. 4 is a rear view according to FIG. 2 of a suspension otherwise corresponding to that in FIG. 2, wherein the distributing appliance is also suspended from an intermediate beam on a cross-beam of the chassis.

The fourth example of embodiment, illustrated in FIG. 4, differs from the second, illustrated in FIG. 2, in basically the same manner, namely by the use of an additional intermediate beam 11, as the third example of embodiment differs from the first. Here again, suspending the distributing appliance from cross-beam 5 by intermediate beam 11 has the advantage that, assuming vehicle 1 to be travelling along a slope as shown, for example, in FIG. 2*a*, the degree to which the said vehicle may tilt, without appreciably affecting the predetermined initial attitude of the said appliance, may be greater than in the case of the example of embodiment illustrated in FIG. 2.

Figure 5:
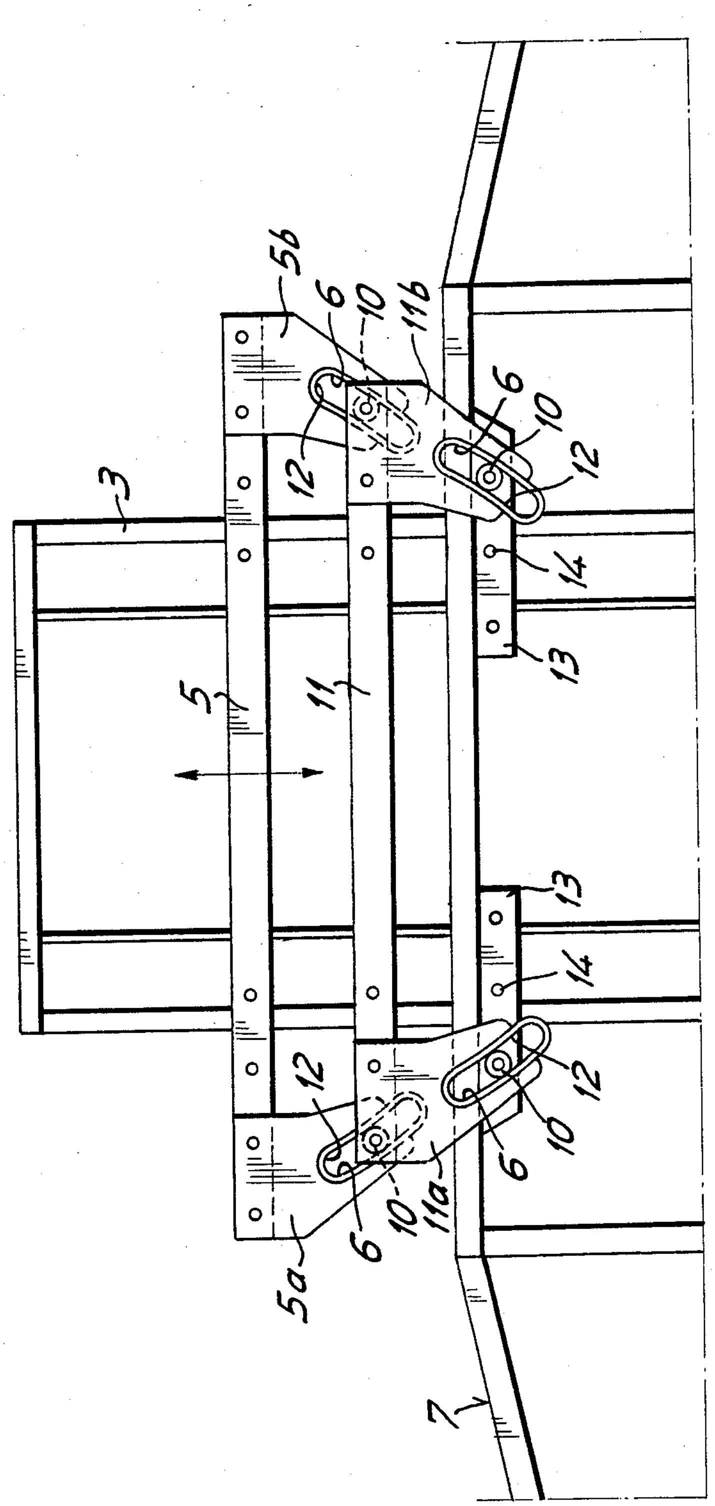
FIG. 5 is a rear view of a part of a suspension modified as compared with that in FIG. 3, to an enlarged scale.

In the case of the fifth example of embodiment, shown in FIG. 5 without any details of the agricultural vehicle shown in the preceding examples of embodiment, each path means such as rollertrack 6, arranged in basically the same manner as the third example of embodiment, both on cross-beam 5 and on intermediate beam 11, is a component in an elongated hole 12 located in each separate end-part **5*a*,5*b* on cross-beam 5 and 11*a*,11*b* on intermediate beam 11, the said end-parts being secured detachably to the said beams. Rollers 10 of distributing appliance 7 are arranged on intermediate parts 13 which may be secured detachably and adjustably to the said appliance. Whereas the extension of roller-tracks 6 to elongated holes 12, the width of which is adapted to the diameter of the said holes, provides the advantage of better retention of the distributingappliance suspension as a whole in the event of shock loads, together with the advantage of improved protection for the said roller-tracks against dust and dirt, to which end the said elongated holes may be provided, on both sides, with protective plates (not shown) fitted, for example, to the parts carrying the said rollers, the detachable arrangement of end-parts 5*a*,5*b* and 11*a*,11*b* to the said cross- and intermediate beams 5 and 11, offers the additional major advantage that one and the same suspension which, according to FIG. 5, is designed for use over horizontal ground as in the example of embodiment illustrated in FIG. 3, may be converted, with the changes shown in FIG. 6 and simultaneous displacement of end-parts 5*a*,5*b* and 11*a*, 11*b*** on the said cross- and intermediate beams, to a suspension for use while the vehicle is travelling along a slope, the operation of the said converted suspension being similar to that of the fourth example of embodiment illustrated in FIG. 4.

Figure 7:
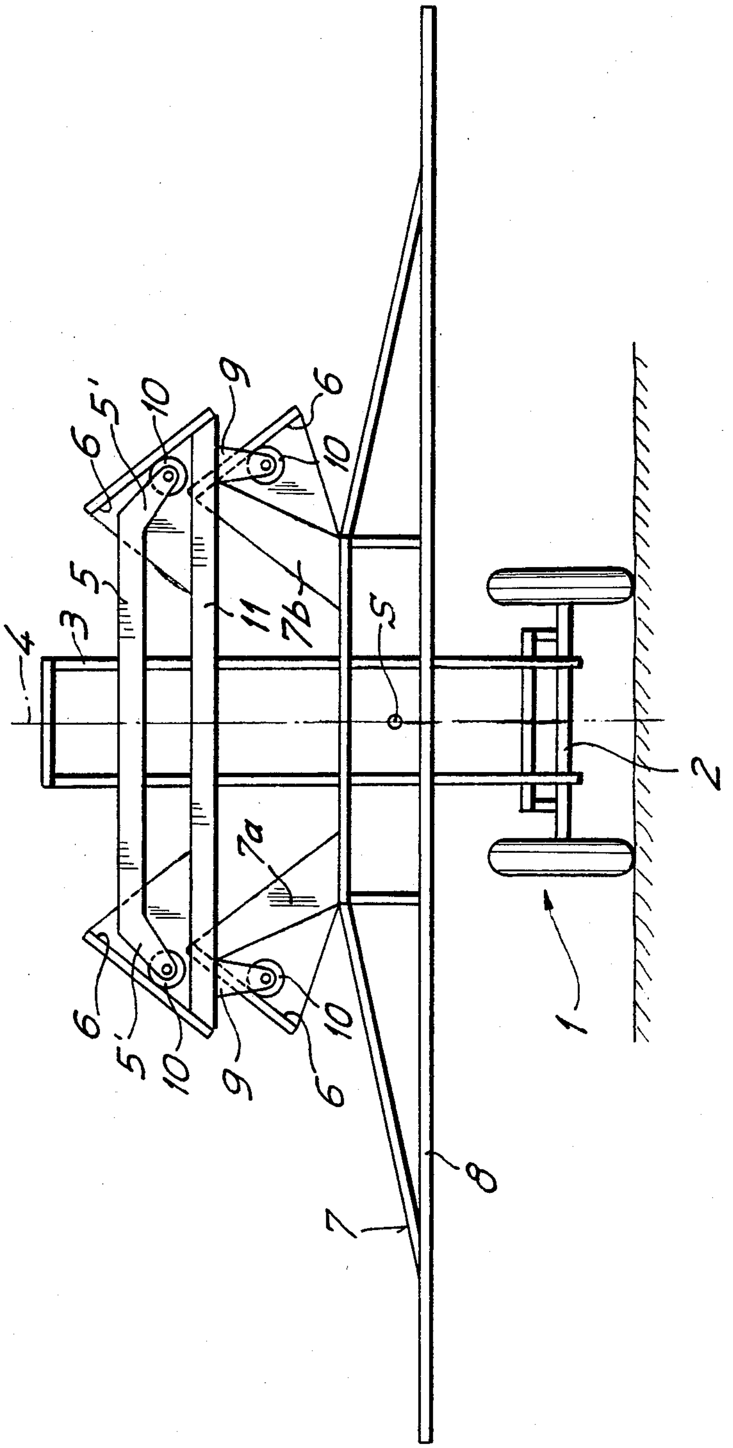
FIG. 7 is a rear view, with the vehicle in a horizontal attitude, of an example of a suspension for a distributing appliance from the cross-beam of the chassis of an agricultural vehicle by an intermediate beam, for use over horizontal ground, the said example being basically a kinematic reversal of the suspension according to FIG. 3.

In the case of the sixth example of embodiment, illustrated in FIG. 7, column 3 comprises cross-beams 5 projecting from both sides and carrying, at each extremity, endparts 5' extending obliquely outwardly, in mirror image, in a downward direction and each carrying a roller 10 at its outer end, whereas the distributing appliance comprises roller-tracks 6 extending obliquely outwardly, in mirror-image to its transverse central plane, in a downward direction, the said tracks being spaced apart at a distance corresponding approximately to the distance between rollers 10, the said tracks being secured to the said distributing appliance by end-parts **7*a*,7*b* running obliquely outwardly in an upward direction. Here again, distributing appliance 7 is suspended from cross-beam 5 by an intermediate beam 11 comprising at each end roller-tracks 6 extending obliquely inwardly in an upward direction, by means of which it is suspended from rollers 10 mounted upon cross-beam 5. In the event of tilting moments, the said suspension can swing, within certain limits, in relation to cross-beam 5, within the transverse plane of vehicle 1**.

In the vicinity of its opposite ends, and below its roller-tracks 6, intermediate beam 11 is fitted with downwardly extending support-arms 9 at the lower ends of which additional rollers 10 are mounted, upon which roller-tracks 6 of distributing appliance 7 rest from above. This means that the said appliance can also carry out swinging movements, in relation to intermediate beam 11, in the same transverse plane as the said intermediate beam.

Figure 7A:
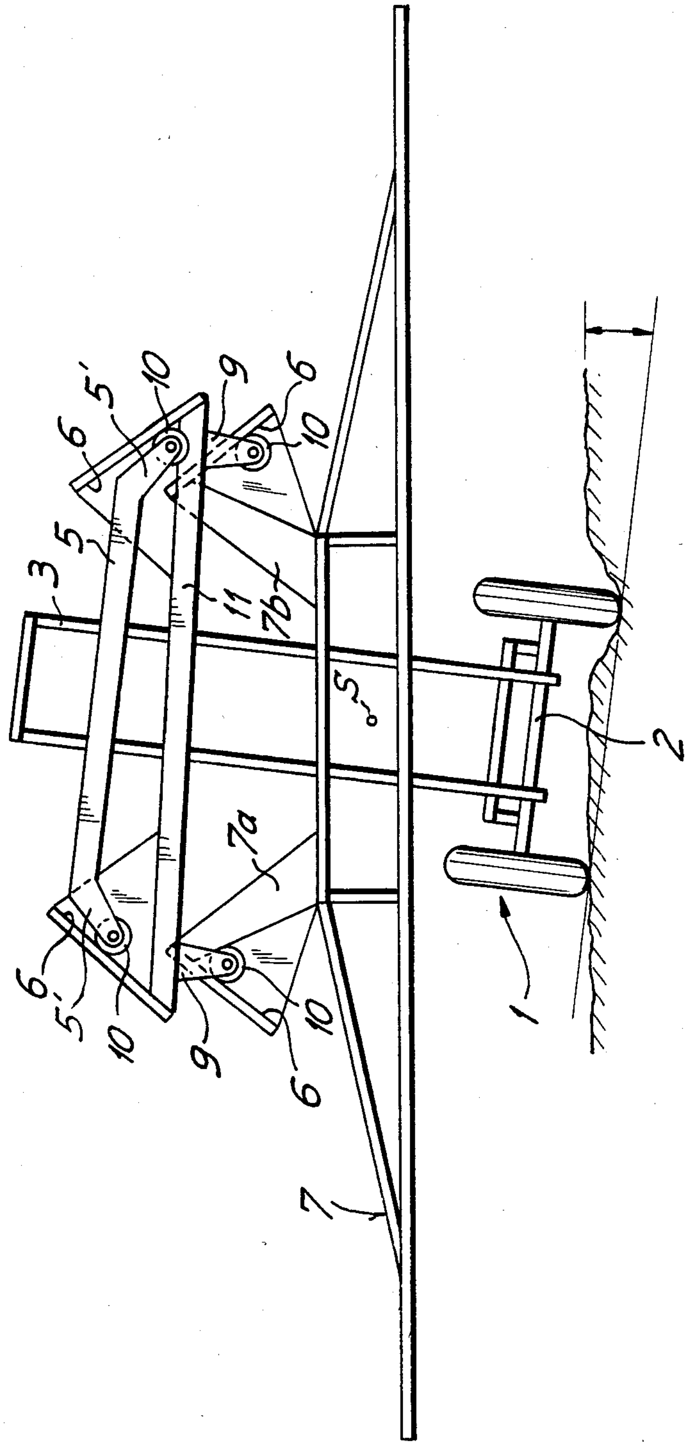
FIG. 7*a* is a rear view of the suspension according to FIG. 7 with the vehicle tilted laterally by a rut on one side.

If, while travelling over horizontal ground, the right-hand wheels of the vehicle, for example, move into a rut and thus cause the vehicle to tilt, as shown in FIG. 7a, the distributing appliance, because of its substantially lower centre of gravity in relation to rollers 10, and its greater mass-inertia, retains almost unchanged its original accurately horizontal attitude. As a result of this, the distribution of sprayed material undergoes no change while the distributing appliance is in use, and highly uniform distribution of the said material may be counted upon, even while the vehicle is travelling over uneven ground and tilts accordingly.

Figure 8:
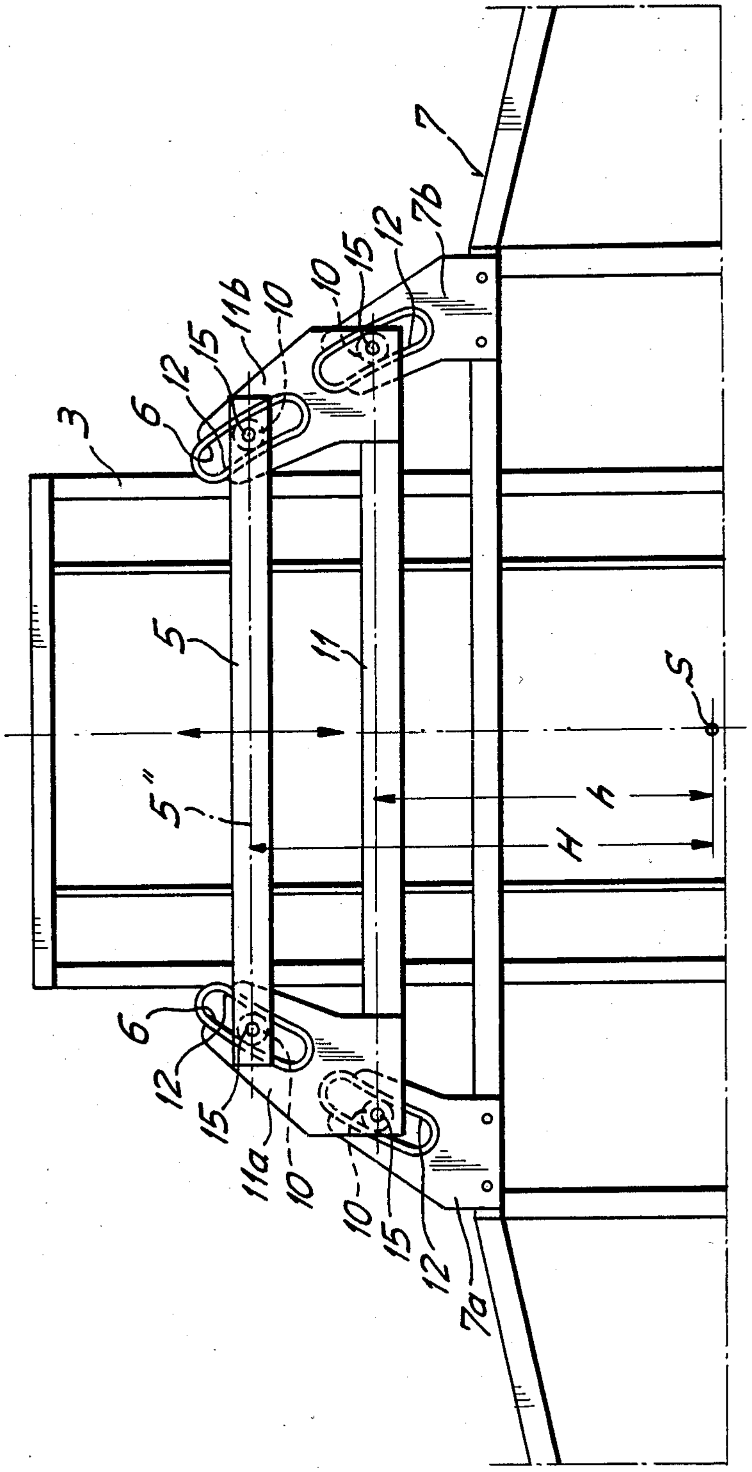
FIG. 8 is a rear view, with the vehicle in a horizontal attitude, to an enlarged scale, of a part of a suspension corresponding approximately to that in FIG. 5, but modified as compared with FIG. 7.

In the case of the seventh example of embodiment, which is illustrated in FIG. 8 without any of the details of the agricultural vehicle shown in the preceding examples of embodiment, roller-tracks 6, arranged in a manner basically similar to those in the preceding example of embodiment, both on intermediate beam 11 and on distributing appliance 7, are each part of an elongated hole 12, the width of which is adapted to the diameter of the rollers, the said elongated holes being located in separate end-parts 11*a*,11*b* of intermediate beam 11 and 7*a*,7*b* of distributing appliance 7, the said end-parts being fitted detachably to intermediate beam 11 and distributing appliance 7. As far as their opposite ends, each carrying a bearing 15 for rollers 10, cross-beam 5 and intermediate beam 11 are are of linear design and structural height H of the distributing-appliance suspension, as measured approximately from longitudinal axis 5' of cross-beam 5, above the centre of gravity S of the said appliance, is utilized in optimal fashion to produce the largest possible pendulum moments for stabilizing the attitude of the said appliance, whenever the moving vehicle tilts transversely.

The same also applies to the swinging movements of distributing appliance 7 in relation to intermediate beam 11, since here again rollers 10, mounted on intermediate beam 11, are at an optimal height h above centre of gravity S of the said appliance.

The method of operation of the suspension corresponding to the seventh example of embodiment is basically exactly the same as that of the sixth example of embodiment according to FIG. 7a.

The detachable arrangement of end-parts 7*a*,7*b* on distributing appliance 7, and of end-parts 11*a*,11*b* on intermediate beam 11, permits these parts to be displaced in the manner already described in connection with FIGS. 5 and 6, in such a manner that one and the same suspension, designed according to FIG. 8, like the example of embodiment illustrated in FIG. 7, for use over horizontal ground, may be converted, with the transpositions shown in FIG. 6 and simultaneous displacement of end-parts 11*a*, 11*b* upon intermediate beam 11, and of end-parts 7*a*,7*b* upon distributing appliance 7, to a suspension which allows the vehicle to travel along a slope, the operation of this converted suspension having already been described in connection with FIG. 4.

It is also conceivable to suspend distributing appliance 7 from cross-beam 5 by means of two or more intermediate beams 11, if this would make it possible to ensure the desired steady horizontal attitude, or the inclined attitude corresponding to the slope, of the said appliance, even in the event of major lateral tilting of vehicle 1.

Instead of roller-tracks and rollers, sliding ways and sliding shoes may be provided which are simpler and more rugged. Rollers 10 may be made of metal in the usual way and may run on ball, roller or plain bearings: however, they may, with advantage, be made of synthetic material and may run on self-lubricating bearings requiring no maintenance.

Figure 6:
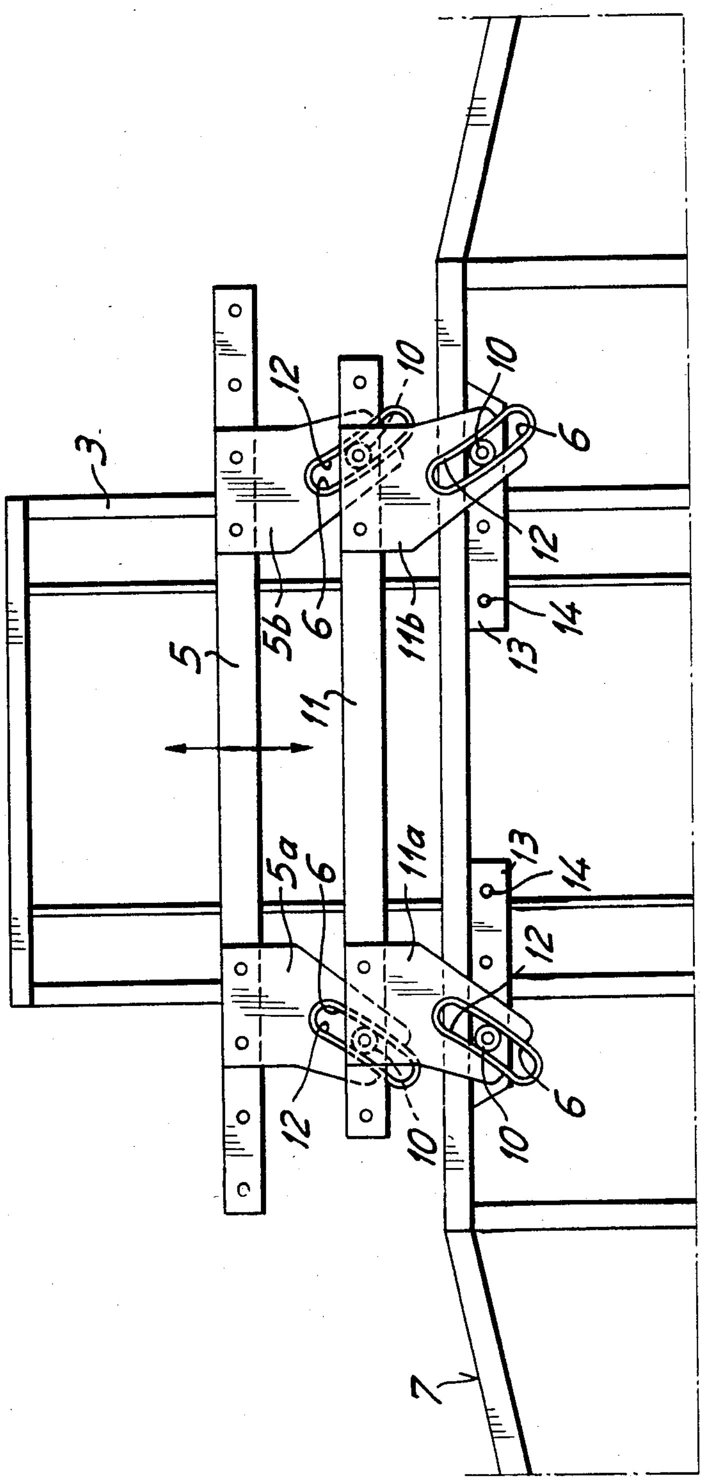
FIG. 6 is a rear view of a part of a suspension modified as compared with that in FIG. 4, to an enlarged scale.

Instead of displaceable intermediate parts 13, the distributing appliance according to FIG. 6 may carry pairs of bearing holes 14 arranged in fixed intermediate parts 13 at different distances apart, into which the axes of the relevant rollers may be inserted as required.

Although in examples 1,4 and 7, angles $\alpha$ and $\beta$ are assumed to be 60°, these angles may vary from 60° within a range of $\pm 15°$ in accordance with the results of practical tests. Finally, depending upon the use to which the distributing appliance is to be put, it may also be advantageous to impart to the roller-tracks or sliding ways on an intermediate beam a slope running in a direction opposite to that of the rollertracks or sliding ways on the cross-beam.

The examples of embodiment, according to FIGS. 2,4 and 6, of a distributing appliance for use along a slope may also be used, with advantage, over horizintal ground, although the examples of embodiment according to FIGS. 1,3,5,7 and 8, specially developed for such ground, provide particularly reliable horizontal guidance of the distributing appliance over such ground in the event of irregularities and corresponding transverse tilting of the vehicle.

The embodiments of the invention in which an exclusive property or privilege is claimed are defined as follows:

1. Suspension of a distributing appliance comprising an elongated spraypipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein the cross-beam means are secured to said column on said chassis in such manner as to be adjustable in height.

2. A suspension according to claim 1, characterized in that the cross-beam means runs linearly to its opposite ends, each end of which carries said path means for supporting said members.

3. A suspension according to claim 1, characterized in that the path means run linearly.

4. A suspension according to claim 1, wherein said path means comprise roller-tracks on an intermediate beam and are inclined in the same way as further roller-tracks on said cross-beam means.

5. A suspension according to claim 1, wherein said path means comprise roller-tracks which possess a slightly concave curve.

6. A suspension according to claim 1, wherein said path means extend obliquely outwardly away from each other.

7. Suspension of a distributing appliance comprising an elongated spray pipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein said cross-beam means include a main cross-beam supported by said column and an intermediate cross-beam non-circularly movably suspended from said main cross-beam, said path means comprise sets of roller-tracks and said members comprise sets of rollers, one set of roller-tracks and respective rollers non-circularly movably supporting said intermediate cross-beam from said main cross-beam and another set of roller-tracks and respective rollers non-circularly movably supporting said distributing apparatus from said intermediate cross-beam.

8. A suspension according to claim 7, wherein said roller-tracks on said intermediate beam are inclined in the same way as the roller-tracks on said main cross-beam.

9. A suspension according to claim 7, wherein said roller-tracks possess a slightly concave curve.

10. A suspension according to claim 7, including end-parts for carrying said roller-tracks at ends of said main and intermediate cross-beams, said end-parts being detachable from said ends and interchangeable from one end to the other end.

11. A suspension according to claim 7, characterized in that each roller-track is formed by a pair of lateral edges of an elongated hole located in a separate end-part of the main cross-beam, and the intermediate cross-beam, the width of the said hole being adapted to the diameter of the rollers.

12. A suspension according to claim 7, characterized in that each roller-track is formed by a pair of lateral edges of an elongated hole located in a separate end-part of the distributing appliance and the intermediate cross-beam, the width of the said hole being adapted to the diameter of the rollers.

13. Suspension of a distributing appliance comprising an elongated spray pipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein said cross-beam means include a main cross-beam supported by said column and an intermediate cross-beam non-circularly movably suspended from said main cross-beam, said path means comprise sets of roller-tracks and said members comprise sets of rollers, one set of roller-tracks and respective rollers non-circularly movably supporting said intermediate cross-beam from said main cross-beam and another set of roller-tracks and respective rollers non-circularly movably supporting said distributing apparatus from said intermediate cross-beam.

14. Suspension of a distributing appliance comprising an elongated spray pipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein said cross-beam means include a main cross-beam supported by said column and an intermediate cross-beam non-circularly movably suspended from said main cross-beam, said path means comprise sets of roller-tracks and said members comprise sets of rollers, one set of roller-tracks and respective rollers non-circularly movably supporting said intermediate cross-beam from said main cross-beam and another set of roller-tracks and respective rollers non-circularly movably supporting said distributing apparatus from said intermediate cross-beam, including end-parts for carrying said roller-tracks at ends of said main and intermediate cross-beams, said end-parts being detachable from said ends and interchangeable from one end to the other end.

15. Suspension of a distributing appliance comprising an elongated spray pipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein said cross-beam means include a main cross-beam supported by said column and an intermediate cross-beam non-circularly movably suspended from said main cross-beam, said path means comprise sets of roller-tracks and said members comprise sets of rollers, one set of roller-tracks and respective rollers non-circularly movably supporting said intermediate cross-beam from said main cross-beam and another set of roller-tracks and respective rollers non-circularly movably supporting said distributing apparatus from said intermediate cross-beam, wherein each roller-track is formed by a pair of lateral edges of an elongated hole located in a separate end-part of the main cross-beam, and the intermediate cross-beam, the width of said hole being adapted to the diameter of the rollers.

16. Suspension of a distributing appliance comprising an elongated spray pipe guided above the ground for the purpose of spraying substances from a chassis of an agricultural vehicle and projecting from both sides of the vehicle, said vehicle having a longitudinal axis and having, seen in the direction of travel of the vehicle at the rear of its chassis, a vertically extending column rigidly secured to said chassis, cross-beam means secured adjacent the top of said column, said cross-beam means extending transversely to said axis, at least two suspension means, each disposed at one end of said cross-beam means and together freely and movably supporting said appliance above its center of gravity within a vertical plane passing through the longitudinal axis of the distributing appliance, said suspension means comprising path means extending angularly with respect to each other and downwardly and forming together a path for said distributing appliance, and members for traversing said path means, wherein said cross-beam means include a main cross-beam supported by said column and an intermediate cross-beam non-circularly movably suspended from said main cross-beam, said path means comprise sets of roller-tracks and said members comprise sets of rollers, one set of roller-tracks and respective rollers non-circularly movably supporting said intermediate cross-beam from said main cross-beam and another set of roller-tracks and respective rollers non-circularly movably supporting said distributing apparatus from said intermediate cross-beam, wherein each roller-track is formed by a pair of lateral edges of an elongated hole located in a separate end-part of the distributing appliance and the intermediate cross-beam, the width of said hole being adapted to the diameter of the rollers.

* * * * *